(12) United States Patent
Loewenthal et al.

(10) Patent No.: US 8,359,971 B2
(45) Date of Patent: Jan. 29, 2013

(54) LEAK RESISTANT SIPHONING DEVICE FOR USE IN FLUID TRANSFER

(75) Inventors: Howard Lee Loewenthal, Hinckley, OH (US); Andrew Raymond Spriegel, Massillon, OH (US)

(73) Assignee: Andhow Innovations, LLC, Hinckley, OH (US)

( * ) Notice: Subject to any disclaimer, the term of this patent is extended or adjusted under 35 U.S.C. 154(b) by 1003 days.

(21) Appl. No.: 10/590,335

(22) PCT Filed: Feb. 25, 2005

(86) PCT No.: PCT/US2005/005812
§ 371 (c)(1),
(2), (4) Date: May 12, 2008

(87) PCT Pub. No.: WO2005/082214
PCT Pub. Date: Sep. 9, 2005

(65) Prior Publication Data
US 2008/0202631 A1 Aug. 28, 2008

Related U.S. Application Data

(60) Provisional application No. 60/547,706, filed on Feb. 25, 2004.

(51) Int. Cl.
*G01F 11/08* (2006.01)
*G01F 11/02* (2006.01)

(52) U.S. Cl. ............... 99/345; 99/516; 99/532; 141/23; 141/24

(58) Field of Classification Search ............ 99/345, 99/494, 516, 535; 141/26, 302, 352, 357
See application file for complete search history.

(56) References Cited

U.S. PATENT DOCUMENTS

| | | | | | |
|---|---|---|---|---|---|
| 1,977,062 | A | * | 10/1934 | Higley | 141/26 |
| 2,172,575 | A | * | 9/1939 | Caulfield | 73/864.15 |
| 4,327,782 | A | * | 5/1982 | McKibben et al. | 141/26 |
| 4,671,330 | A | * | 6/1987 | Miles | 141/24 |
| 4,846,376 | A | * | 7/1989 | Palmer | 222/190 |
| 5,394,789 | A | * | 3/1995 | Evans et al. | 99/345 |
| 5,408,919 | A | * | 4/1995 | Hutzler et al. | 99/345 |
| 5,638,872 | A | * | 6/1997 | Porter | 141/26 |
| 5,720,330 | A | * | 2/1998 | Schmalz, Jr. | 141/26 |
| 5,787,799 | A | * | 8/1998 | Mohrhauser et al. | 99/345 |
| 5,875,823 | A | * | 3/1999 | Porter | 141/26 |
| 6,575,204 | B1 | * | 6/2003 | Godfrey et al. | 141/26 |
| 6,634,393 | B2 | * | 10/2003 | Porter et al. | 141/8 |

* cited by examiner

*Primary Examiner* — Gene Kim
*Assistant Examiner* — John E Simms, Jr.
(74) *Attorney, Agent, or Firm* — Spriegel & Associates, LLC

(57) ABSTRACT

An improved, leak resistant, siphoning device that includes an elongated hollow body member, a means for filling and emptying the hollow body member, such as an elastomeric resilient suction bulb and a valve placed between the hollow member and the filling/emptying means. The suction bulb defines a chamber therein, so that when it is squeezed and released it will create suction to direct fluid up through the first open head end into the elongated hollow body member using pressure differential. Squeezing the suction bulb can release the liquid and partial solids held within the elongated hollow body member out of the first open head end. The suction bulb also has an optional opening for venting heated air from the bulb, and a means to selectively close the opening for creating vacuum or pressure required to draw or expel liquid from the tube.

20 Claims, 6 Drawing Sheets

LEAK RESISTANT SIPHONING DEVICE FOR USE IN FLUID TRANSFER

BACKGROUND OF THE INVENTION

The present invention relates to a siphoning and/or discharge device for use in fluid transfer. An example of such a device is a food baster. Other examples include medicine droppers and pipettes. More specifically the present invention relates to a leak resistant siphoning and discharge device for handling hot fluids, and which employs an elastomeric valve to prevent leakage.

Basters are most commonly used in cooking to transfer hot juices from the bottom of a cooking pan back on to the meat/food being cooked in the pan to keep the meat/food moist while cooking. Commercially there have been few substantial improvements made to these devices due to the low cost nature of the device. But, the low cost basters do not adequately contain the liquid so as to effectively reduce leakage of liquid or partial solids that are drawn into the device for transfer to the desired location.

Basters come in a variety of sizes and shapes. Basters typically consist of a plastic, metal or glass elongated hollow body member and a resilient suction bulb, which is removably attached to the elongated hollow body member. The basters use suction, created by squeezing the resilient bulb, to draw liquid and partial liquids into the elongated hollow body member. It relies on the vacuum being held by the resilient bulb or the user to hold a constant pressure on the resilient bulb. To discharge the liquid and partial solids from the open end of the tube, the bulb is squeezed to increase the pressure of the air above the liquid and partial solids, expelling them.

Liquid and/or partial solids that are drawn up into the hollow member often leak out of the baster unintentionally. Also if the elongated hollow body member is tilted at a sufficient angle it allows the liquid contents to break vacuum, across the baster, causing the liquid to leak out of the elongated hollow body member. Leaks can also occur because the heat from the liquids causes the pressure of the air to build up in the bulb and force out some of the liquid or because something inadvertently places pressure on the bulb, such as a weighted object or a person inadvertently putting a hand or leaning on the bulb.

The disadvantage of leaking is that the liquid or partial solids are hot enough to burn users or people and pets that are nearby. The fats often contained in the liquid cause the fluid to burn to a greater extent than other hot liquids would. Also the leaking contents can spill on the floor, the counter, or the stove creating an unsightly mess, or worse, a safety hazard because of slip-and-falls or because an oven's heating element can ignite the liquid creating a fire hazard.

In addition, over time a resilient bulb stiffens and becomes less resilient decreasing its ability to pull a vacuum and to hold liquids and partial solids in the elongated hollow body member. The materials that are used are such that they deteriorate over time. Frequently cracks develop in the bulb, which again affects the ability to create suction in the elongated hollow body member. The deterioration can lead to inadequate sealing, which again causes problems with the baster holding vacuum. The junction between the bulb and the elongated hollow body member also deteriorates over time as the resilient bulb ages, losing elasticity. Many of the commercially available basters can be cleaned in dishwasher, but this can accelerate deterioration by assembling and disassembling the bulb and the elongated hollow body member. Also, the heat of the dishwasher can cause the elastomeric bulb to outgas elastomers and/or plasticizers and lose resilience and the ability to seal with the hollow body.

Further, the prior art basters typically cannot be tilted at an angle so as to be effective in easily and efficiently basting foods. The basters which attempt to solve the problems above present expensive solutions, and are not commercially cost effective. For example, where the basters have a primary valve located at the open tapered end of the tube, they tend to not seal adequately, are difficult to clean, or are complex in design and/or in operation.

The problems with the prior art basters are seen in the prior art patents. For example, U.S. Pat. No. 6,634,393 B2 to Jerry Porter discloses a baster where a primary valve is located at the outlet of the tube and the valve is a ball to close off the open end of the tube. This presents sealing problems. The weight of the ball assembly and liquid is the only means for the ball to return to its sealing position. The slippery nature of the liquid being drawn into the tube will tend to prevent the ball from sealing. Porter teaches adding a projection to activate or move the ball to allow liquid to be drawn in, but this also allows the user to "bump" or dislodge it causing an accidental discharge of liquid. Further, the air vent located near the bulb will also act as a means for liquid to run out when the baster is rotated to a horizontal plane. Furthermore the valve that Porter suggests is dependent on gravity to return to its sealing position. Changing the angle and orientation of the baster tube will limit the effectiveness of the sealing. Furthermore, the Porter baster does not rely on vacuum in the tube to keep the liquid suspended in the tube. The vacuum is released by means of the vent and relies on the mechanical valve in the open tip where the liquid is drawn into the baster tube to keep the liquid suspended in the tube. Since this mechanical valve is dependent on its orientation to maintain an adequate seal. The range of movement of this baster is very limited.

Porter, U.S. Pat. No. 6,634,393, teaches a baster which, in operation, vents air from an upper chamber through a hole placed in the top of the hollow tube. The function of this hole is to allow air to bleed off. Then, upon releasing the bulb a vacuum is created, by the bulb edge covering up the hole, but the vacuum has to be sufficient to overcome the leakage of the vent hole in order to draw the liquid into the tube. This function required the "pumping" action of the bulb due to the volume of the baster being greater than the bulb and the diminished effectiveness of the bulb to create a vacuum due to the vent hole. Due to the nature of an open hole in the top of the tube, the Porter baster does not appear to prevent liquids from coming into contact with the user and causing harm, if the baster is in a horizontal position.

Porter, U.S. Pat. No. 5,638,872, discloses a baster which includes a pair of valves where one valve is located at the tip of the tube and second valve is a one way valve. Porter does not claim it to be bi-directional or "open" in nature. This valve by description is automatic in nature. The description of this valve does not require the user to address it in order to make the baster function. The language describes a one-way air valve in the bulb that is intended to exhaust air only. When the bulb is released from its depressed state it creates vacuum. The valves that are described are pictured in the top surface of the bulb and are claimed to prevent liquid from escaping. Even though this feature is claimed there appears to be a lack of enough details to make them function. Porter appears to prefer having a hole in the upper portion of the tube with a rubber band around it to act as a valve.

Kummer, U.S. Pat. No. 5,514,118, teaches a medicine dropper which employs a valve between the barrel and the bulb to keep the fluid from filling the barrel further and thus limit the intake to the dosage amount. The valve is a float ball check valve where the ball comes against an annular rim 134 inside of the barrel to prevent further input into the barrel. Since the ball could not be removed for cleaning, it could be problematic in getting the dropper clean, and would appear to create another loose part.

Elastomeric valves have found use in preventing leakage in drinking cups for children, where they are employed in the so called "sippy cups". Examples of these valves can be found in, for example, Freeman et al, U.S. Pat. No. 5,186,347; Brown, U.S. Pat. No. 4,991,745; and Fusco et al, U.S. Pat. No. 6,568,557.

SUMMARY OF THE INVENTION

The present invention relates to an improved siphoning device for liquids and/or partial solids, particularly of the type used for basting foods. The present invention offers a low cost way to keep the device from leaking or splattering hot liquid or partial solids by utilizing a check valve assembly inserted into a hollow body member opening at a bulb end of the body member hollow tube. The range of motion of this device is not limited and this invention can be easily rotated from a vertical to horizontal to upside down and back orientation while maintaining its ability to contain the liquid in the tube.

The present invention has three members, an elongated hollow body member that allows, for filling or emptying the hollow body member, and an elastomeric bulb to draw fluid up into the elongated hollow body member, and a one piece valve assembly inserted into a hollow body member opening at a bulb end of the hollow body member. The addition of the valve assembly, allows a baster to be held in various orientations with less fluid spillage than without the valve assembly. The valve can be a single valve, a valve assembly having two opposing valve chambers which allow air to be expelled outward and also for air to be drawn inward and other valves known by those of skill in the art. The use of a bi-directional check valve, for example, requires a positive pressure is necessary to force the liquid out of the tube. In addition, a vent can be provided in the bulb so that the vent needs to be closed to draw a vacuum. While the optional creates an additional operation for the user to perform to use the baster it adds to the safety and reliability of the device.

The check valve assembly located at the top of the tube, bulb end improves the seal and reduces the volume of air over the column of liquid, increasing the effectiveness of the baster to hold the liquid without leaking. By making the check valve assembly out of a single elastomeric element, it offers an economical solution to the current prior art.

The addition of a vented bulb that can be selectively open or closed by the user offers additional performance benefits of allowing the air that is being heated by the hot fluid to be released. This neutralizes the positive pressure that is created in the bulb that would cause the liquid to be discharged. The bulb has an opening that is molded as part of the design that directs the heated air away from the user.

Less spillage keeps the kitchen area cleaner and safer. The leak resistant baster/device reduces the opportunity for liquid to be accidentally spilled on the heating elements of the oven reducing the chance of smoke and fire and the need for cleaning.

The device potentially reduces the amount of time to baste because the oven shelf does not have to be extended out in order to baste the food because the baster can be operated at greater angles. The food requires less movement in order to be basted. The oven door can be open for less time therefore saving energy costs and reduces cooking time.

The baster components can be cleaned in a dishwasher. Even as the bulb wears, and the seal between the bulb and the elongated hollow body member becomes less effective the check valve assembly maintains the sealing properties and allows the baster to hold suction more effectively, thereby increasing the safety and useful life of the baster.

BRIEF DESCRIPTION OF THE DRAWINGS

The present invention will now be described by the way of non-limiting examples, with reference to the attached drawings in which.

DETAILED DESCRIPTION OF THE INVENTION

The present invention has many advantages over the prior art baster. This invention draws on the principals of a vacuum and the addition of a valve assembly inserted into a baster tube opening at a bulb end of the tube to create a leak resistant device that is simpler to operate, more dependable and as easy to clean than the prior art that is commercially available.

Figure 1:
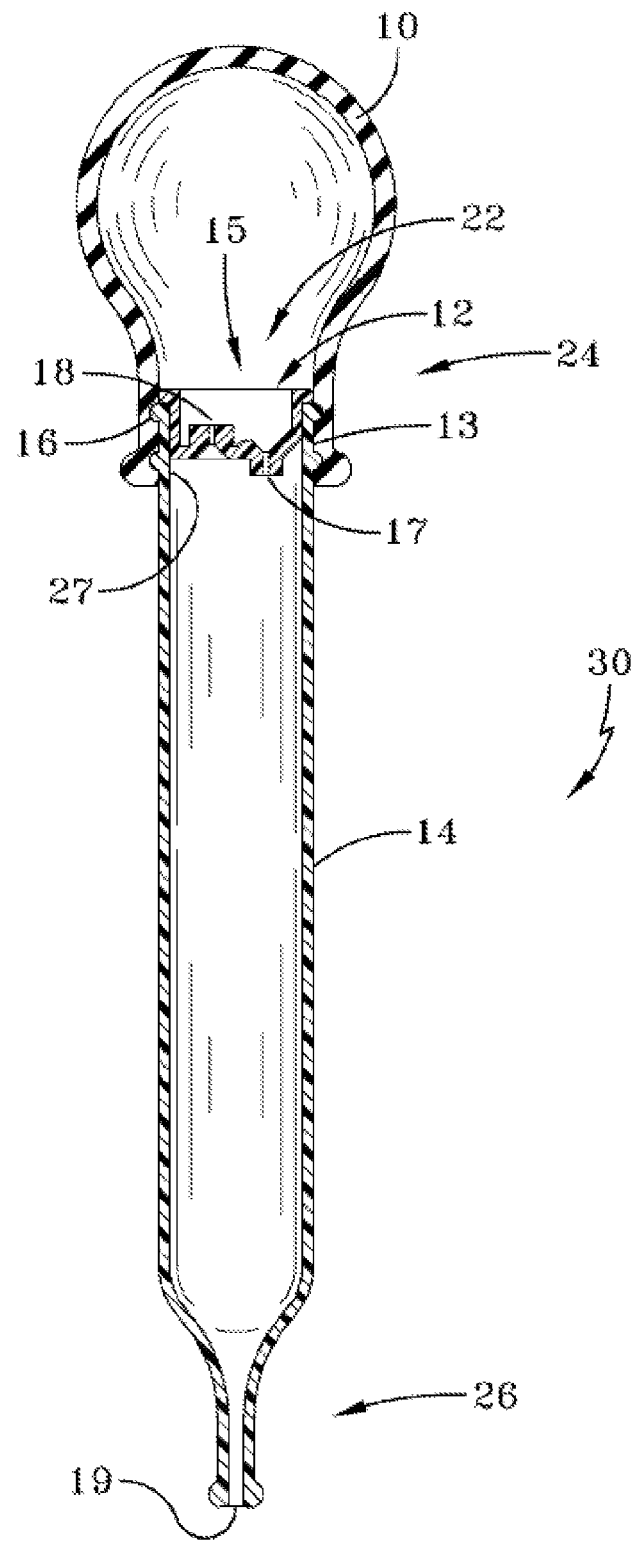
FIG. 1 is side view partially in cross section of a baster/device.

One configuration of the present invention is illustrated in FIG. 1. The present invention, as represented via the example of a baster/device 30, consists of a resilient bulb 10, a one piece check valve assembly 12 and a elongated hollow tube 14. Stretching an inner surface of the bulb opening 15 over a first end 24 of the tube 14 having a first opening 22 easily assembles these parts. Circumferential projections 16 are added to the elongated tube 14 to increase the sealing properties between the bulb 10 and the tube 14.

Although the invention is illustrated as a baster/device, it should be appreciated that the present invention could be applied to any device used for fluid transfer such as a medicine dropper, an eye dropper, a pipette, a liquid/liquid or liquid/solid separator, or the like. Further, although the device is illustrated using a resilient bulb for filling and discharging or emptying the tube, other methods could be employed. For example, the filling/emptying could be a piston device which by a linear motion, in one direction, expels air from the tube and in a reverse linear motion draws liquid into the tube. Examples of these type devices are shown in U.S. Pat. Nos. 5,408,919 and 6,457,400 to Hutzler et al., the disclosures of which are incorporated herein by reference.

The addition a valve, such as the one piece check valve assembly 12 shown in FIG. 1, between the tube 14 and the bulb 10, has several beneficial advantages. It reduces the dependency of the device 30 on the leak proof fit between the bulb 10 and the tube 14. It also adds the ability to control the vacuum, which allows the liquid column in the tube 14 to be held. Any changes in pressure will increase or decrease the vacuum holding the liquid. Any increase in pressure will allow the baster/device 30 to expel hot liquid, by employing the check valve assembly 12 it is possible to control the vacuum with no additional effort.

The check valve assembly 12 consists of an elastomeric material that is molded as a one piece assembly. It is possible to construct the valve assembly 12 with two opposing first and second check valve openings 17 and 18, respectively. This allows the size of the first and the second check valve openings 17 and 18 to be optimized for the amount of pressure required to make them open. The elastomeric materials are not critical as long as they provide the requisite strength, flexibility and sealing properties when in a neutral position. Examples of materials that could be employed include silicones, urethanes, and elastomeric polymer and rubber compositions.

The operation of the baster/device 30 is as follows: Pressure is applied to bulb 10. Air is expelled through the first check valve 17 of the check valve assembly 12 out through hollow tube 14 and exiting through a second end 26 of the tube 14. While maintaining pressure on the bulb 10 the second end 26 of the tube 14 is placed into liquid. User gradually releases pressure on bulb 10. As pressure is being released, a vacuum is created in the tube 14 at the front of the check valve assembly 12 opening the second valve 18 creating suction at the second opening 19 of the hollow tube 14 where the liquid is drawn into the tube 14. After the desired amount of liquid is extracted or the tube 14 is filled, the baster second end 26 is removed from the liquid. As illustrated in FIG. 1 a second opening valve is not needed at the second opening 19 of the hollow tube 14 where the liquid is drawn into the tube 14 for the baster/device 30 not to leak or be dripless.

While the liquid is contained in the baster/device 30 it is now possible to remove any residual pressure from the bulb 10 and have the liquid remain in tube 14 without leakage. The additional air that is drawn into the bulb 10 expands due to the liquid heating the air which is drawn through the check valve opening 18. The first and second check valve openings 17 and 18 operate automatically from a closed to open back to closed orientation in a manner such that the vacuum holding the column of liquid is maintained.

For the liquid to be emptied from the tube 14 pressure is applied to the bulb 10. As the pressure increases at the check valve assembly 12, the air will open the check valve assembly 12 expelling the liquid out of the second opening 19 of the tube 14.

Figure 2:
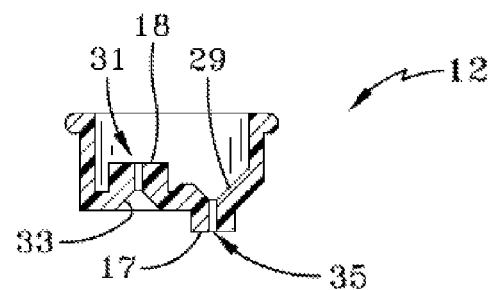
FIG. 2 is an enlarged cross section view of a one piece check valve assembly with two elastomeric valve openings of the baster/device in FIG. 1.

FIG. 2 shows an enlarged cross section of the one piece check valve assembly 12 with the first valve 17 and the second valve 18. The first valve 18 has a first opening 31 for air flow. The second valve 17 has a second opening 33 for air flow. The first valve 18 and the second valve 17 have chamfered edges 29 and 35 to bias their opening under pressure differentials. The valve assembly 12 has a flange 38 that prevents the check valve assembly 12 from being inserted too far into the tube. As noted, the material used can be silicone or urethane but is not limited to these materials. Chamfered edges are well known by those of skill in the art.

Figure 3:
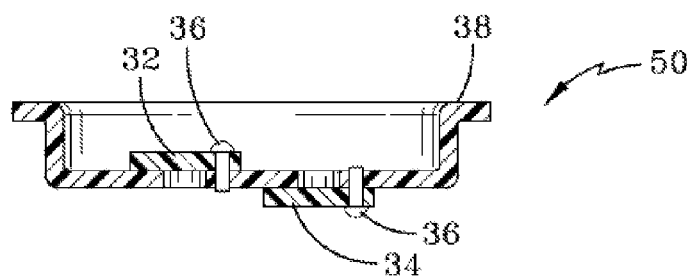
FIG. 3 is an enlarged cross section of an alternate embodiment of the check valve assembly utilizing two elastomeric reed valves.

As seen in FIG. 3 a check valve assembly 50 can be made using reed valves 32 and 34. The reed valves are attached to the valve assembly 50 using common type fasteners 36 such as rivets. The materials used can be composite or metal but are not limited to these materials.

Figure 4:
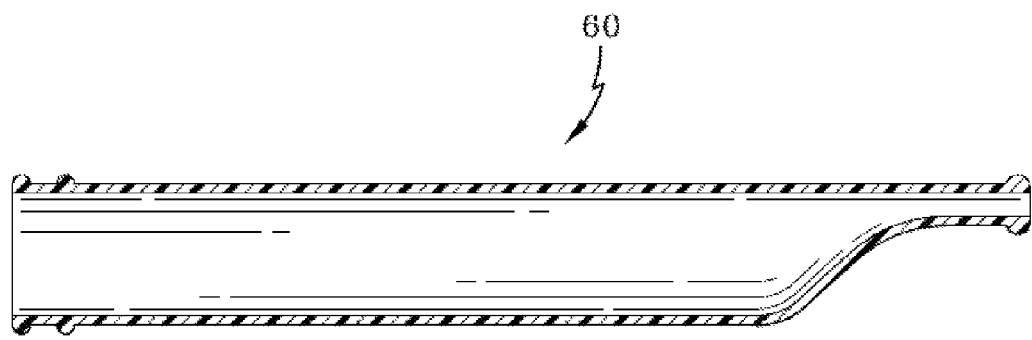
FIG. 4 is a side elevation view of an alternate embodiment of the hollow tube member.
Figure 5:
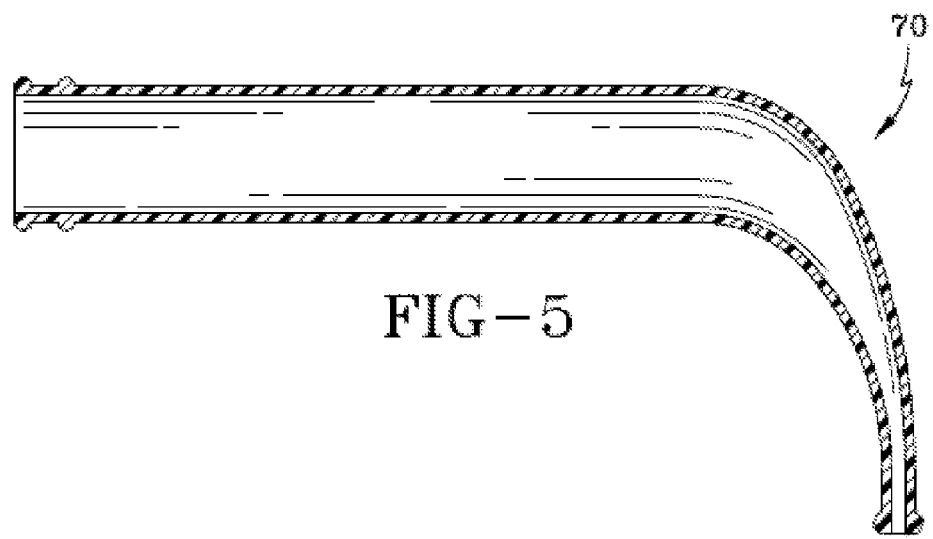
FIG. 5 is a side elevation view of an alternate embodiment of the hollow tube member.

The elongated hollow tube 14 can be made in various configurations such as those shown in FIG. 4 and FIG. 5, elongated hollow tubes 60 and 70 respectively. Although, the shapes of the tubes are shown as illustrated many other elongated hollow tube shapes can be designed and manufactured by one skilled in the art. The materials used can be metal or composite but is not limited to these materials.

Figure 6:
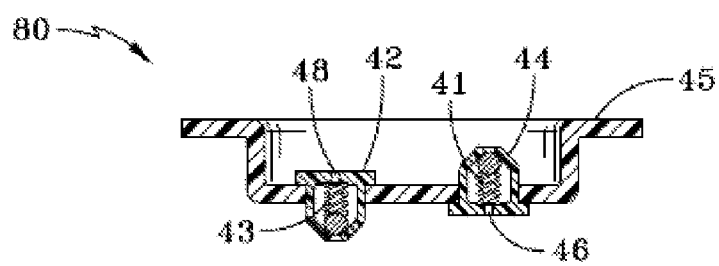
FIG. 6 is a cross sectional view of an alternate embodiment of the check valve assembly using two ball valves.

The check valve assembly 80 shown in FIG. 6 can be made using a first spring 43 first ball valve 42 and an opposing second spring 41 in a second ball valve 44. The first ball valve 42 and the second ball valve 44 actuate when the pressure pushes the ball against the first and the second spring, 43 and 41, respectively allowing flow through a first and second opening 48 or 46 respectively. The valve assembly 80 has an outer flange 45 that prevents the valve assembly 80 from being inserted too far into an inside diameter 27 of a tube.

Figure 7:
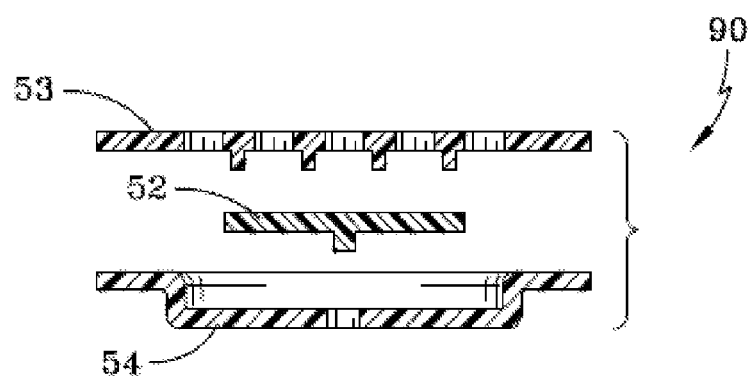
FIG. 7 is a cross sectional view of an alternate embodiment of the check valve assembly using a single disk check valve.

FIG. 7 illustrated a cross sectional view a single disk check valve assembly 90 with a disk check valve upper component 53 a check valve middle component 52 and a check valve lower component 54. Disk check valve assembly operation is well known by those of skill in the art.

Figure 8:
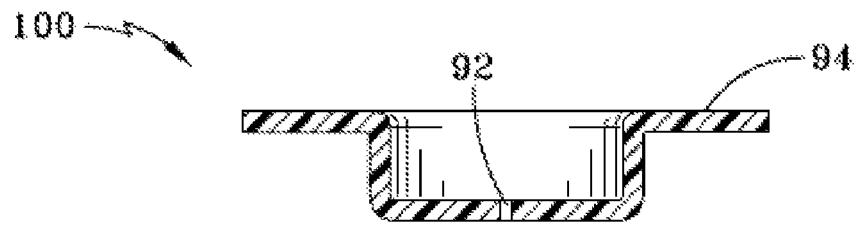
FIG. 8 is a cross sectional view of an alternate embodiment of the check valve assembly using a two directional single elastomeric valve.
Figure 9:
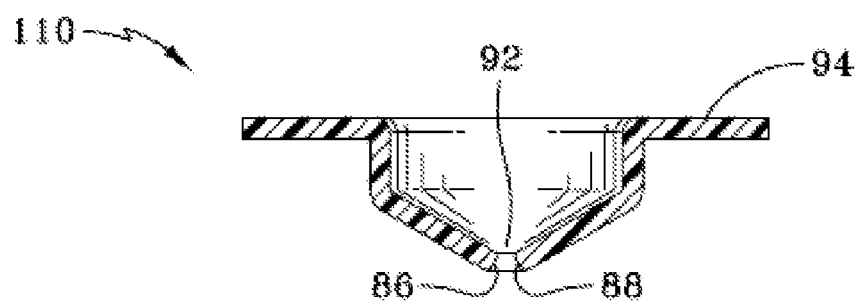
FIG. 9 is a cross sectional view of the check valve assembly shown in FIG. 8 actuated to release the liquid from the baster.
Figure 10:
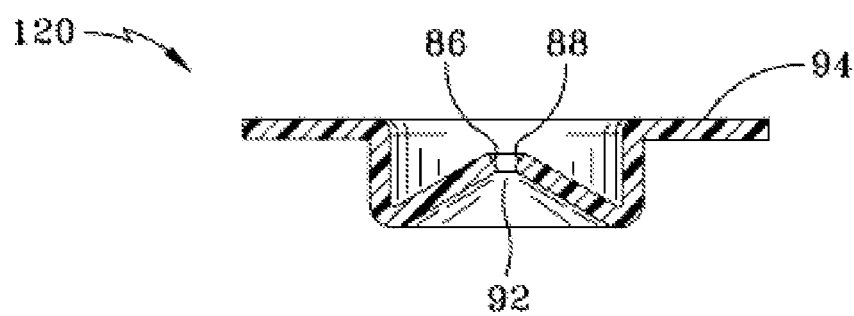
FIG. 10 is a cross sectional view of the check valve assembly shown in FIG. 8 actuated to draw fluid into the baster/device.

In the simplest form it is possible with this design to utilize a check valve 100, 110 and 120 that has bi-directional properties as illustrated in FIGS. 8, 9 and 10. In this version, with the single check valve 100, it is possible for the check valve 100 to perform its function in both directions. Due to the nature and geometry of the elastomeric material it is possible to have the sealing properties on cut faces 86 and 88 of a slit 92 (FIG. 8) that is perpendicular to the plane of material of the valve 94. By having this geometry symmetrical to the plane of the valve 94 it allows the valve 100 to open in either direction when pressure or vacuum is applied to a surface of the valve 100. It is also possible to alter the geometry to improve performance in one direction of operation. It is also able to construct a more complex geometry where the planes of the valve are no longer perpendicular or the surfaces are no longer flat. Elastomeric valves and valve slit geometries are well known by those of skill in the art.

FIG. 9 and FIG. 10 show the elastomeric valve 100 shown in FIG. 8 opening in both directions, 110 and 120 respectively, as illustrated. Such valves are known and have been referred to as valves having a "trampoline-like" construction since they take advantage of the natural resiliency of the elastomeric materials to move under pressure, but return to their original shape once the pressure is released. In their rest position, the valve is in a closed, sealed position and prevents the passage of fluids from one side to the other of the valve.

Figure 11:
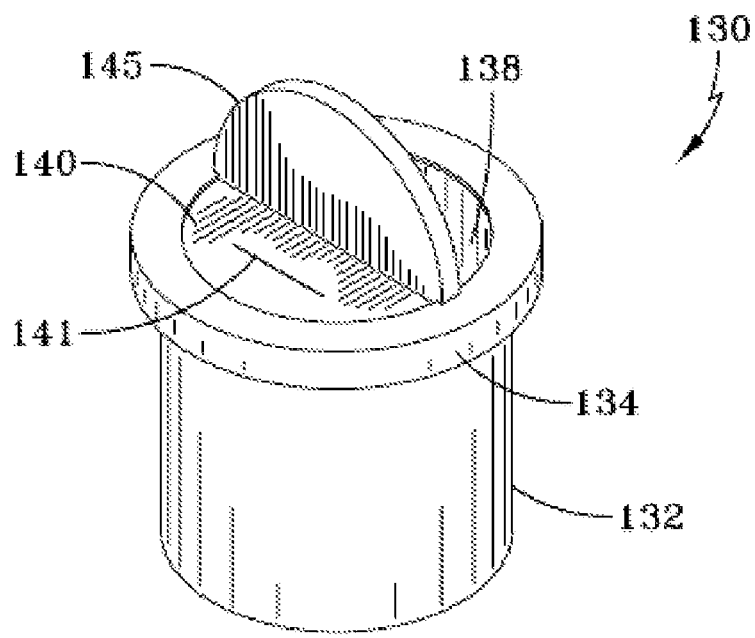
FIG. 11 is a perspective view of an elastomeric valve assembly in accordance with the present invention.
Figure 12:
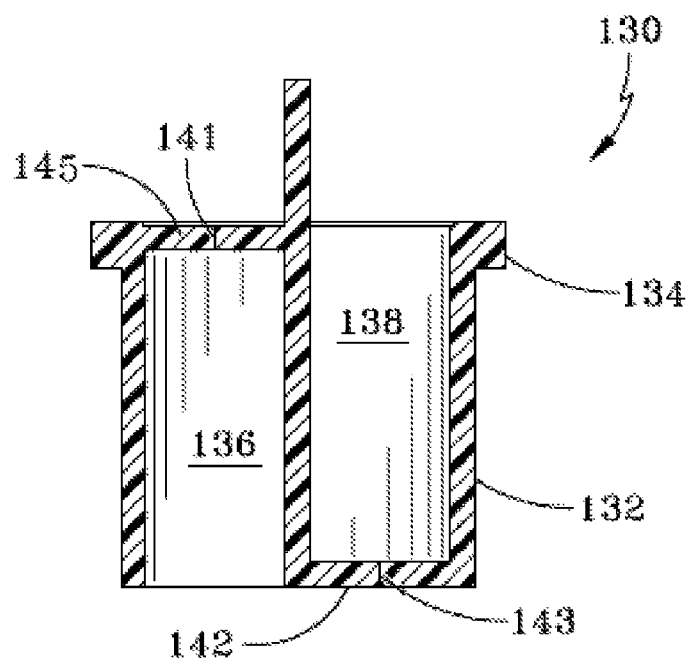
FIG. 12 is a cross-sectional view of the valve assembly shown in FIG. 11.
Figure 14:
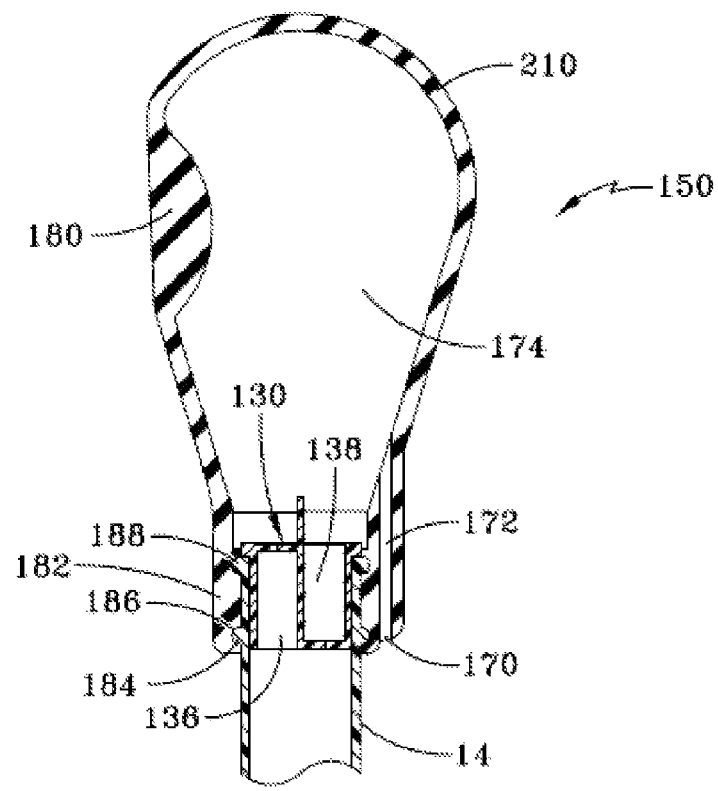
FIG. 14 is a partial cross-sectional view of a baster in accordance with the present invention and showing additional embodiments of the present invention.

FIGS. 11 and 12 show yet another embodiment of a resilient valve assembly 130 that can be employed in the present invention. The valve assembly 130 can be made as a one piece valve from an elastomeric material comprising a castable or injectable silicone rubber, polyurethane, elastomeric rubber or copolymer, or the like, known by those of skill in the art. The valve assembly 130 has a generally cylindrical shape with an outer wall 132 with an outer wall diameter which sealingly engages the inner wall inside diameter 27 (FIG. 1) at the first end 24 of the tube 14 to hold the valve assembly 130 non-fixedly in place. An annular rim 134 which is integral with the outer wall 132 will engage the first end 24 of the tube 14 (FIG. 1) to prevent the valve assembly 130 from being pushed further into the tube 14. The valve 130 can consist of a hemicylindrical first and a hemicylindrical second chamber 136 and 138 which allow the fluids to pass more easily one way through the first or the second chambers 136 or 138 and in the opposite direction more easily through the opposing chamber 136 or 138. At the end of each of the first and the second chambers 136 and 138 is a integral first and second wall (145 and 142 in the chambers 136 and 138) which otherwise seals the chambers 136 and 138, that functions as the valve assembly 130. The first and second walls 145 and 142 have first and second slits 141 and 143 respectively so that when pressure is applied to the first and second walls 145 and 142 the movement will cause the slits 141 and 143 to open. The other end of the first and second chambers 136 and 138 is open and in communication with the direction from which the fluid is coming. As shown in FIG. 14, the first chamber 136 is in open fluid communication with the tube 14, while the second chamber 138 is in open fluid communication with the bulb 10. The configuration of the chambers 136 or 138 is such that pressure will build in one chamber 136 or 138 of the valve 130 and open the valve chamber 136 or 138, but not open the opposing chamber 136 or 138 as easily. For example, when the bulb 10 is compressed in a way which puts pressure on the valve 130, air is preferentially forced into the chamber 138 (due to a chamfered edge, for example) rather than against the first wall 145 and as a result the fluid is passes through the slit 143 in the second wall 142. When the bulb 10 is used to create a vacuum, the pressure builds in the chamber 136 and the flow through the valve 130 is reversed.

Integral with the valve 130 is a component for removing the valve 130, as represented by a pull tab 146. The pull tab 146 is configured for easily pulling the valve out of the tube 14 when it needs to be cleaned or replaced. The shape is shown as cylindrical, but that is not critical and a valve could be rectangular, triangular, or any appropriate geometric shape known by one of skill in the art.

Further, as can be appreciated, the valve 130 could be constructed without the annular rim 134 so that the valve 130 is held in place inside tube 14 by forcing the valve 12 in and relying on the resilience of the elastomeric character of the materials of construction. Alternatively, although not shown, a valve could be placed into a bulb, either as a separate item or as an integral part of a bulb. In either case, the valve 130 is between the tube 14 and the bulb 10.

Figure 13:
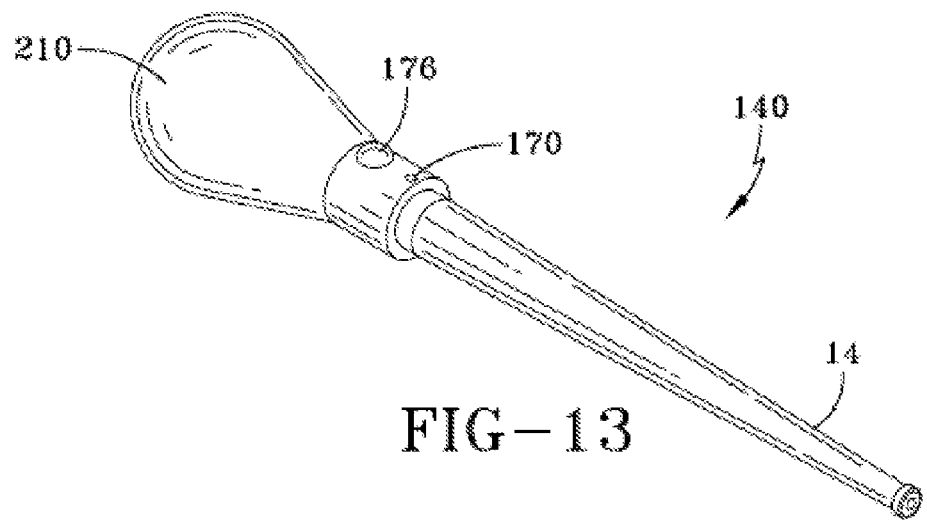
FIG. 13 is a perspective view of a baster in accordance with the present invention and showing an air vent and means for closing the air vent.

As illustrated in FIGS. 13 and 14, the resilient bulb 210 can also be molded with a vent hole 170 in such a manner to allow the user to close off the vent hole 170 before the bulb can create pressure or vacuum. In this manner by restricting air out of the vent hole 170, this allows air to be expelled through the tube 14. If the bulb 210 is being released while the hole is restricted air will be drawn into the bulb 210. The vent hole 170 can be positioned in an ergonomic place that allows it to be easily depressed as the bulb 210 is being squeezed or released. The vent hole 170 can be positioned in the bulb 210 to direct the heated air away from the operator as it is being used. The bulb 210 can include a composition, such as Santoprene elastomer, molded into the bulb 210 to provide a better griping surface and can be done in an ergonomic design to allow more efficient and comfortable use.

As can be seen in FIGS. 13 and 14, the vent hole 170 can be positioned as an opening in the bulb 210 where a passage 172 connects the opening with an interior 174 of the bulb 210. This allows air, such as hot gases, to pass out of the bulb 210 rather than build up inside it. When it is desired to expel air from the bulb 210 and the tube 14, the passage 172 can be closed by applying finger pressure to collapse the passage 172 since the passage 172 is made from the same resilient material as the bulb 210. For convenience, a button or protuberance 176 which is integral with the surface of the bulb 210 can be provided to facilitate the application of pressure to close off the passage 172. As illustrated in FIG. 14, the use of a button or other shape is optional and the geometry is not critical.

FIG. 14 also illustrates the use of a flat weighted portion 180 integral with the bulb 210 so that when the baster is on its side, the baster will tend to remain at that spot rather than be free to roll about. The shape and amount of weighting are not critical and need not be in one spot. But, when the weighted portion is opposite the vent 170, the vent is not covered by the weight of the baster. FIG. 14 further illustrates the use of grooves and ridges to attach the bulb 210 to the tube 14. As shown, a portion 182 of bulb 210 which is used to attach it to tube 14 can be provided with annular grooves 186 which will mate with annular ridges or protuberances 184 on end 188 of tube 14. In this way, when bulb 210 is attached to tube 14, the user is assured that the bulb is in place when the ridges 184 mate with the grooves 186. Although, this feature is not critical to the invention and it is possible to use only the ridges 184 without the grooves. Still further, the same could be applied to the inside surface of the tube where the annular ridges 184 are provided and these can be designed to mate with the grooves 186 in the side wall 132 of the valve 130. Alternatively, annular ridge(s) or protuberance(s) could be part of a side wall of a valve and groove(s) could be provided on an inside of the tube. In either case, these features provide a more secure fit by a bulb on a tube.

As can be seen in another embodiment 140 with the present invention in FIGS. 13 and 14, the air vent 170 in the bulb 210 can be clearly visible making the present device safer to the end user. The present invention is designed such that it can be taken apart and put in the dishwasher as separate pieces for cleaning. Further, the present invention can be placed on a rack that holds a baster vertically for an "extended" time to separate immiscible liquids or liquid and solids where the solids are lighter than liquids, such as the fats from the fluid. The baster/device 30 of the present invention can be turned almost horizontal and not leak. In other words, in FIG. 1 with a first axis of the device 30 that is parallel to a long axis of the tube when the tube is in a vertical position at zero degrees (0 degrees), and a second axis at ninety degrees (90 degrees) and perpendicular to the first axis the device 30; wherein with the fluid in the tube 14 the device 30 can be turned from zero degrees (0 degrees) to approximately less than ninety degrees (90 degrees) without leaking the fluid.

A baster of the present invention can have a tube 70 (FIG. 5) with a curved end to make it easier to draw fluid from a pan and allow the baster to be held in almost a horizontal position while the curved end would be almost vertical. This allows the food to be basted without pulling the rack out of the oven. The baster 30 (FIG. 1) of the present invention allows the fluid to be "squirted" at the basted food, and would most allow larger solids to be drawn up in the tube 14. By allowing the tube 14 and tip of the present invention to be a larger diameter than a typical baster, since the tube diameter size is not critical, the present invention would be useful with aquariums to transfer fish since it does not have a lower valve would most likely injure the fish. In such a circumstance, the end of the tube could have a flared opening to direct the fish into the tube as water is being drawn into the tube.

Various modifications and alterations that do not depart from the scope and spirit of this invention will become apparent to those skilled in the art. This invention is not to be duly limited to the illustrative embodiments set forth herein.

What we claim is:

1. A leak resistant siphoning device for use in fluid transfer, comprising:
   an elongated hollow tube having a first opening at a first end of the tube and a and a second opening at a second end of the tube;
   a valve assembly inserted at least partially through the first opening and sealingly engaging an inner wall of the tube; and
   a bulb for creating a vacuum for drawing air from the tube through the valve assembly and thereby causing fluid to flow into the tube through the second opening, and for pressurizing air inside the bulb to force the air from the bulb through the valve assembly into the tube and thereby cause fluid to be expelled from the tube through the second opening, the bulb having an opening stretched over the first end of the tube and sealingly engaging an outer surface of the tube.

2. The device of claim 1 wherein: a second valve bulb and valve assembly are separate pieces; and
   the valve assembly is sufficiently small to permit the bulb opening to be stretched over the first end of the tube while the valve assembly is inserted at least partially through the first opening and sealingly engaging the inner wall of the tube.

3. The device of claim 1 wherein
   the valve assembly operates as a bidirectional check valve between the bulb and the tube.

4. The device of claim 3, wherein the valve assembly comprises
   a first valve that opens in response to a vacuum drawn by the bulb, whereby the first valve opens to admit air into the bulb and draw the fluid into the tube through the second opening; a second valve that opens in response to positive pressure in the bulb, whereby the second valve admits air from the bulb into the tube to force fluid out of the tube through the second opening.

5. The device of claim 1, wherein the valve assembly is a single molded piece of an elastomeric material.

6. The device of claim 2,
   wherein the valve assembly has an annular rim that prevents the valve assembly from being inserted completely inside the tube; and
   the valve assembly has a pull tab configured to facilitate removing the valve assembly from the tube.

7. The device of claim 1, wherein the tube is curved.

8. The device of claim 1, wherein the valve assembly is an integral part of the bulb.

9. The device of claim 1, wherein the device is a baster.

10. The device of claim 1, wherein the bulb comprises a flat portion and the device preferentially rests on the flat portion when the device is placed upon its side on a flat surface.

11. The device of claim 3, wherein the check valve functionality is provided by one or more slits in an elastomeric valve member.

12. A leak resistant siphoning device for use in fluid transfer, comprising:
    an elongated hollow tube having first and second ends, the elongated hollow tube having a first opening at a the first end,
    a second opening at the second end and an elongated body region extending from the first end to the second end, the elongated body tapering proximate the second opening;
    a bulb forming a non-fixed seal with an outer surface of the tube proximate the first opening, and
    a one piece valve assembly at least partially inserted through the first opening and forming a non-fixed seal with an inside surface of the tube proximate the first opening;
    wherein the valve assembly is a one piece molded assembly comprising a first check valve and a second check valve; and
    the first and second valves operate in opposing directions so that the first valve opens in response to a vacuum in the bulb and admits air from the tube into the bulb and the second valve opens in response to positive pressure in the bulb and admits air from the bulb into the tube.

13. The device of claim 12, wherein:
    the bulb and valve assembly are separate parts; and
    the valve assembly is sufficiently small to permit the bulb to be stretched over the first end of the tube while the valve assembly is at least partially inserted into the first opening and sealingly engaging the inner wall of the tube.

14. The device of claim 12, wherein the valve assembly is elastomeric.

15. The device of claim 12, wherein the valve assembly has an outer surface dimensioned to form an interference fit with the inside surface of the tube proximate the first opening.

16. The device of claim 12, wherein the bulb has circumferential grooves that mate with ridges on the tube to increase the seal between the tube and the bulb.

17. The device of claim 12, wherein the bulb has a manually controlled vent opening configured for venting the bulb without forcing air through the valve assembly.

18. The device of claim 12, wherein
    the first and second valves each have an opening that is a slit formed in an elastomeric material.

19. The device of claim 12, wherein the device is a baster.

20. The device of claim 12, where the bulb comprising a flat weighted portion so that the device will preferentially rest on the flat weighted portion when the device is placed on a flat surface.

* * * * *